Dec. 21, 1965  R. W. SCHUMANN ETAL  3,224,349
ELECTRO-OPTICAL PRINTER AND CONTROLS THEREFOR
Filed April 18, 1963  5 Sheets-Sheet 2
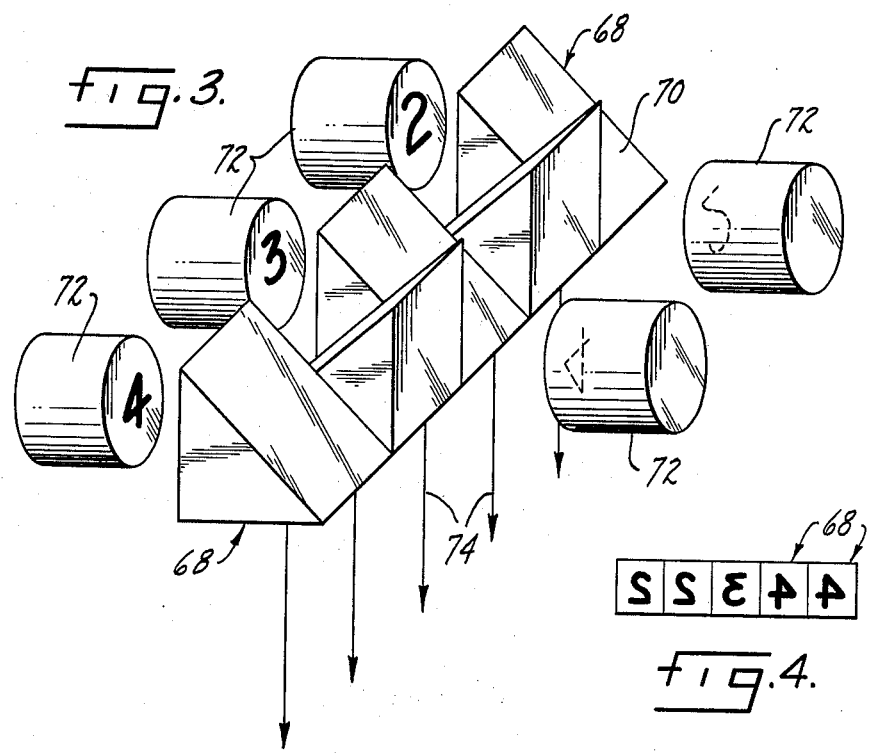
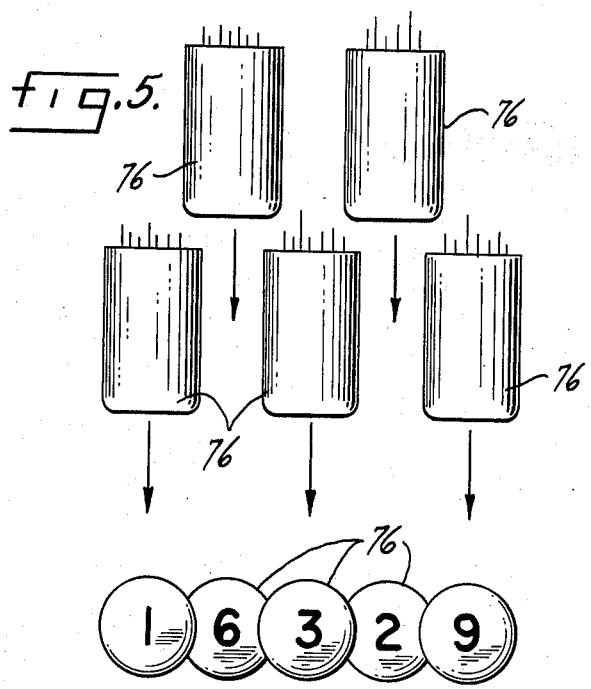
INVENTORS
ROBERT W. SCHUMANN
NORMAN S. JONES
BY Parker & Carter
Attorneys.

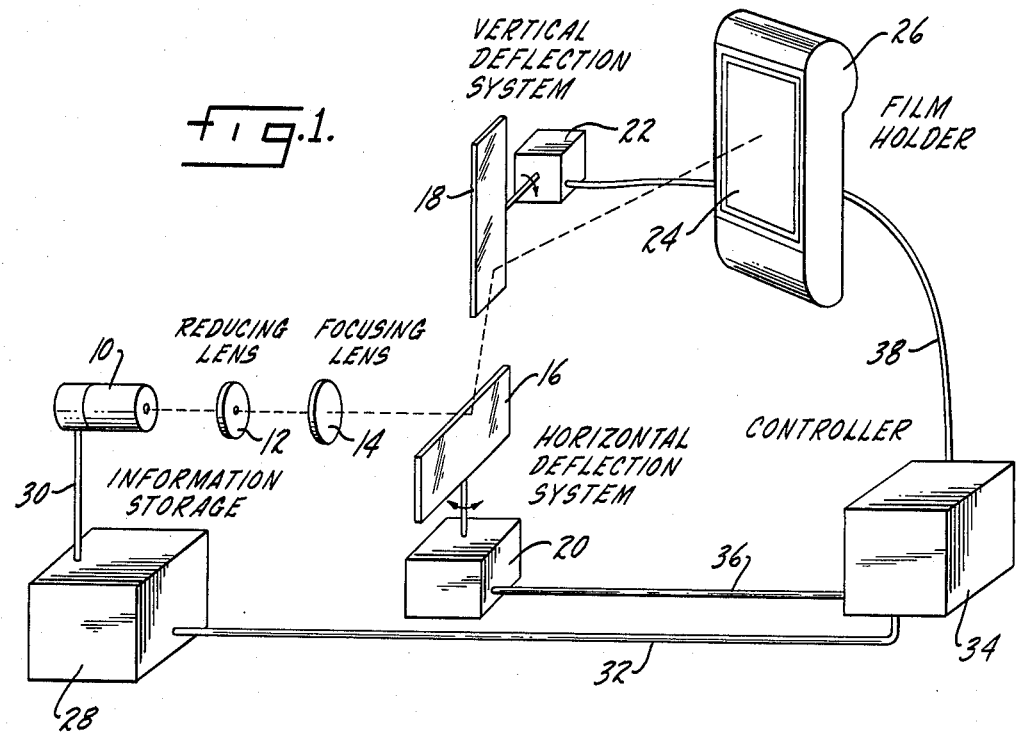
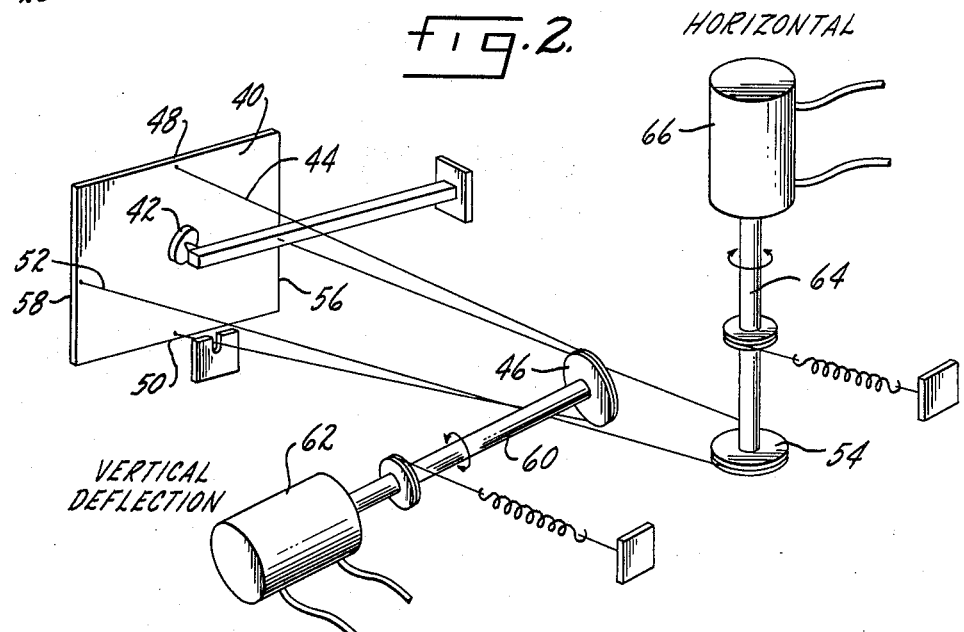

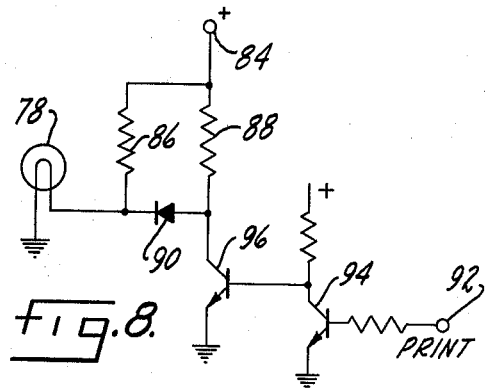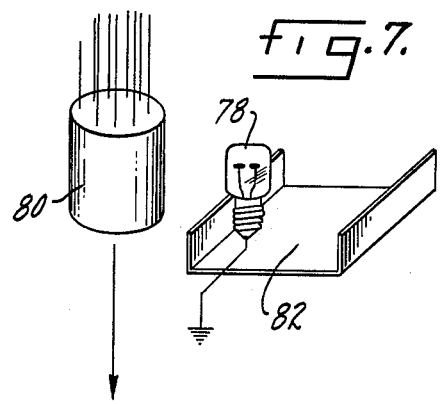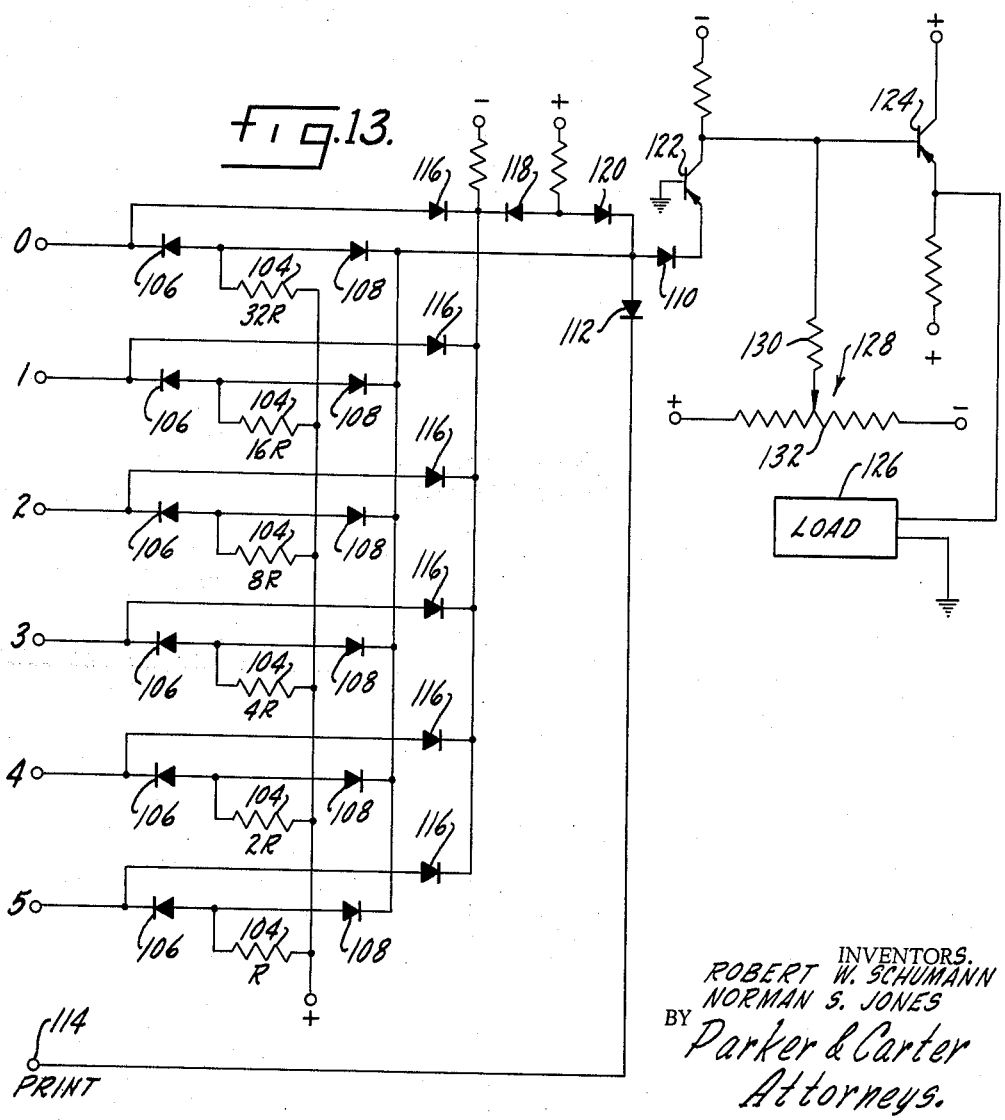

Dec. 21, 1965  R. W. SCHUMANN ETAL  3,224,349
ELECTRO-OPTICAL PRINTER AND CONTROLS THEREFOR
Filed April 18, 1963  5 Sheets-Sheet 4 fig.9.

| | (1) | (2) | (3) | (4) |
|---|---|---|---|---|
| (a) | 33215 | | | |
| (b) | | | | 97321 |
| (c) | | | 44417 | |
| (d) | | | | |

INVENTORS.
ROBERT W. SCHUMANN
NORMAN S. JONES
BY Parker & Carter
Attorneys.

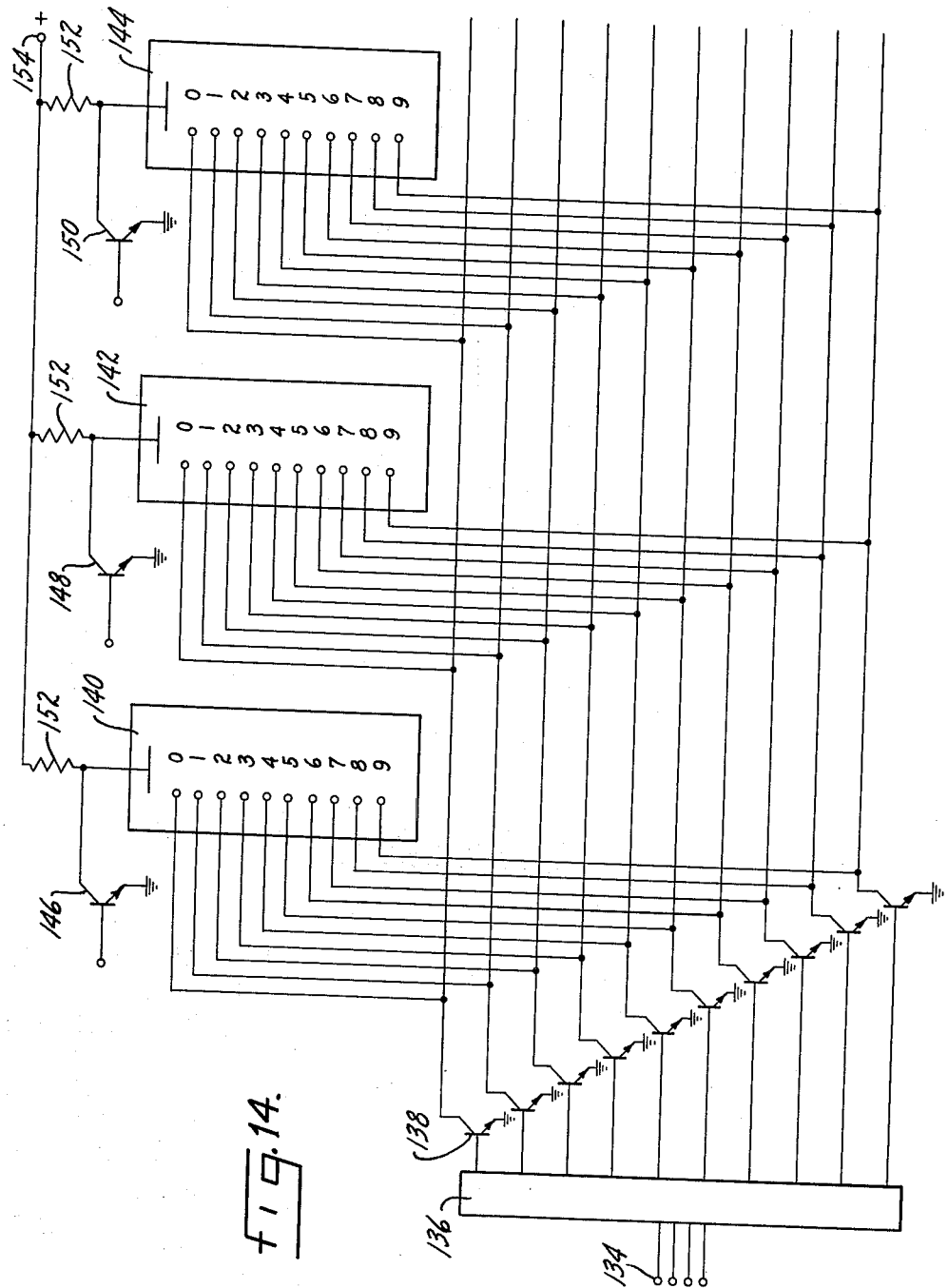

United States Patent Office 3,224,349
Patented Dec. 21, 1965

3,224,349
ELECTRO-OPTICAL PRINTER AND CONTROLS THEREFOR
Robert W. Schumann and Norman S. Jones, Madison, Wis., assignors to Nuclear Data, Inc., Madison, Wis., a corporation of Illinois
Filed Apr. 18, 1963, Ser. No. 273,869
12 Claims. (Cl. 95—4.5)

This invention relates to a system for the high speed printing of characters, particularly to improvements for providing rapid read-out from an information source, and is a continuation-in-part of our co-pending application Serial No. 236,874, filed November 13, 1962, now abandoned.

A primary purpose of the present invention is to provide an improved system for effecting high speed display and printing of alphabetical and numerical information.

Another purpose is to provide a relatively simple and reliably operable read-out system for visual recording of stored information.

Another purpose is a recording system of the type described which provides a printed sheet of high information density.

Another purpose is to provide control circuitry for an electro-optical printer suitable for printing information at a rapid rate.

Another purpose is an electro-optical printer of the type described which records in a column and row format.

Another purpose is an electro-optical printer of the type described which can print in columns and rows, with random selection of predetermined column and row positions.

Another purpose is a recording system of the type described including means for printing serially received input information at a rapid rate.

Another purpose is a recorder of the type described utilizing cold cathode gas character image producing tubes.

Another purpose is a printer of the type described using gas character image producing tubes and including means for insuring ionization of the tubes.

Other purposes will appear in the ensuing specification, drawings and claims.

The invention is illustrated diagrammatically in the following drawings wherein:

FIGURE 1 is a diagrammatic illustration of the recording system, with the enclosure removed for purposes of illustration, FIGURE 2 is a diagrammatic illustration of a portion of a modified recording system, FIGURE 3 is an enlarged perspective illustrating one arrangement of the character forming tubes, FIGURE 4 is a bottom view, on a reduced scale, illustrating the result of the tube arrangement shown in FIGURE 3, FIGURE 5 is a top plan view of a modified form of tube arrangement, FIGURE 6 is a front view of the tube arrangement illustrated in FIGURE 5, FIGURE 7 is a diagrammatic illustration of an arrangement for adding ionizing radiation to the character forming tubes, FIGURE 8 is a circuit diagram of the arrangement illustrated in FIGURE 7, FIGURE 9 illustrates one method of printing using the recording system disclosed herein, FIGURE 10 illustrates a second method of printing using the recording system disclosed herein, FIGURE 11 illustrates a third method of printing using the recording system disclosed herein, FIGURE 12 illustrates a fourth method of printing using the recording system disclosed herein, FIGURE 13 is a circuit diagram showing the control system for the movable mirrors in FIGURE 1, and FIGURE 14 is a circuit diagram illustrating means for controlling the character forming tubes.

In FIGURE 1, which illustrates an electro-optical printer with the enclosure removed, a character image producing device is illustrated at 10. This device may take any one of a number of forms, and one preferred type of character forming tube is a cold cathode gas discharge tube of the type made by the Burroughs Corporation, commercially identified as tube type 6844A and known in the trade as the "Nixie" tube. This particular type of tube can only produce numerical characters, and it is within the scope of the invention to have other types of character producing tubes which form both alphabetical and numerical characters. The character image formed by the tube 10 may be directed through a reducing lens 12 and a focusing lens 14.

The deflecting system for directing the character image from the tube 10 to the recording medium includes a first movable mirror surface 16 and a second movable mirror surface 18. The mirror surface 16 which pivots about a vertical axis is controlled by a galvanometer movement, current operated, and illustrated diagrammatically at 20. Mirror 18, which pivots about a horizontal axis, will be controlled by a similar galvanometer movement indicated diagrammatically at 22. The image from the tube 10 after being reflected from the mirror surfaces 16 and 18 will be directed upon a predetermined limited area of a photographic film 24 positioned in a film holder 26. The film 24 preferably is of the Polaroid type and is self-developing. It is through movement of the deflecting mirror surfaces that information, sequentially fed into the recording system, can be printed in a predetermined array on the film surface.

In the schematic illustration of FIGURE 1, an information storage device 28 feeds character selection signals through a line 30 to the character producing tube 10. The information storage device may also feed digital character positioning information through a line 32 to a controller 34. The controller 34 may convert the digital positioning information to analog form and feed it through lines 36 and 38 to the galvanometer movements 20 and 22.

Depending upon the type of character image forming device, the reducing lens and focusing lens may or may not be necessary. What is important is to provide a small bright image at the tube 10 and to direct this small bright image to a limited area of the film strip 24. The image forming device must be capable of being turned on an off in a matter of microseconds.

FIGURE 2 illustrates a single universally movable mirror 40 which may be used to replace deflecting surfaces 16 and 18 of FIGURE 1. The mirror 40 is supported on pivot 42 by a wire 44 connected over a sprocket 46 to opposite upper and lower edges 48 and 50 of the mirror. The mirror is also supported by wire 52 connected over a sprocket 54 to opposite side edges 56 and 58 of the mirror. Sprocket 46 is mounted on shaft 60 of a vertical drive mechanism 62 and sprocket 54 is mounted on shaft 64 controlled by horizontal drive mechanism 66. The vertical and horizontal drive mechanisms 62 and 66 may be controlled in the same manner as the galvanometer movements 20 and 22 of the form shown in FIGURE 1. In this case, however, the mirror 40 will universally move on pivot 42.

Gas discharge tubes of the type described earlier are particularly advantageous in that they form a conveniently bright image and may be turned on and off in times on the order of a few microseconds. In order to print complete numbers or words, or groups of characters, it is advantageous to place a number of these together and operate them simultaneously. For example in printing numerical information, if the largest number to be printed has five digits, then an arrangement of five tubes of this type in a side-by-side arrangement will speed up the printing operation. However, in order to place the characters or digits close enough together to have a large information density on the recording medium, it is necessary to position the tubes in a manner other than a side-by-side arrangement.

Considering that five tubes will be sufficient to print any number or group of characters desired, the tubes may be arranged as shown in FIGURE 3. A plurality of reflecting prisms 68 are each arranged with their 45 degree angle surface 70 positioned to reflect the character image from the tubes 72. The image from each of the tubes will be reflected downward, as indicated by the arrows 74, and the resultant number will be as shown in FIGURE 4. The advantage in such an arrangement is that the prisms 68 will only reflect a portion of the output end of each of the tubes. The character spacing is less than if the tubes were side by side.

A second arrangement for decreasing character spacing is shown in FIGURE 5. The plurality of gas discharge image forming tubes 76 are arranged with three tubes in front and two tubes behind the front tubes. The number of tubes, and whether or not three are in front or three behind, is not important. What is necessary is that the overall arrangement of tubes cuts down the spacing between characters. The tubes overlap in such a way that the space between the characters is substantially less than the spacing if the tubes were placed side-by-side. Only a portion of the output end of each tube in the second row will be seen.

A printer of this type may only be used a small part of a working day. The character forming tubes should be extinguished during non-printing periods to prevent fogging of the film. However, in order to have high speed operation, it is necessary that the character forming tubes, which preferably are of the gas discharge type, ionize immediately upon command. In order to insure that gas will ionize immediately, it is desirable to add ionizing radiation to the tube. One arrangement used to add ionizing radiation to the tube to provide for instant ignition of the tube is to add a small amount of a radioactive substance within the tube itself. Such a substance will emit alpha radiation in an amount sufficient to ionize the tube upon command.

A second method for adding ionizing radiation is to provide an ordinary glow lamp indicated at 78 in FIGURE 7, closely spaced to the tube 80, but shielded from the film by a shield or filter 82. A glow lamp filled with argon gas will emit ultraviolet and deep blue radiation which will be sufficient to cause instant ionization of the tube 80, when it is turned on.

The ionizing tube 78 at times can cause fogging of the film if it is left on at all times. Accordingly, the circuit of FIGURE 8 is used to maintain the tube 78 normally at very low power. It is necessary however to maintain the tube 78 in the "on" state at all times, as it also may have ionizing problems. In the circuit of FIGURE 8 a plus voltage is applied at terminal 84, for example in the neighborhood of 150 volts. A small amount of current will be permitted to flow through resistors 86 and 88 to the tube 78. These two resistors plus diode 90 provide a keep alive circuit which permits a current as much as a thousand times less than normal operating current to flow through the tube 78 at all times. When the print command is applied to terminal 92, transistors 94 and 96 will supply this signal through diode 90 directly to tube 78 to cause it to assume its full brilliance. This tube will then provide the ionizing radiation for the character image producing tube.

A preferred printing arrangement is illustrated in FIGURE 9. When a bank or group of character producing tubes are arranged in the manner shown in either FIGURES 3 or 5, a whole number can be printed at once. One printing sequence is to first print the top number in the left-hand column. The following rows in this column will then be printed in sequence. After one column has been printed, the adjacent column will be printed. The path of printing is indicated by the dotted line 98. It is not necessary to begin printing at either the left-hand side of the photographic film strip or the right-hand side, and the information is printed in a convenient manner depending upon the information source.

When printing in the manner shown in FIGURE 9 and using the mirror system of FIGURE 1, mirror surface 16 will remain stationary during the time that the first column is printed. During this period mirror 18 will be pivoted or rotated in predetermined steps so that each number will be printed a predetermined distance below the preceding number. If at times there are no numbers for a certain row in a certain column, a blank can be left, as illustrated in FIGURE 9. The only time mirror 16 will move is when changing from one column to the next, whereas mirror 18 will move after each printing. In the alternative, the deflection current applied to mirror 18, rather than being increased in steps to sequentially move the mirror, may be continually increased. There will be only a minimum of smearing of the printed information as each of the characters will be displayed by the tubes for only a few microseconds. It is preferred however to use the step-by-step arrangement to avoid any smearing or smudging of the film.

FIGURE 10 illustrates a second printing method. In this case the numbers are printed in rows rather than in columns as illustrated in FIGURE 9. The numbers may be printed across the film strip and successive rows will follow. The dotted line 100 illustrates the printing path. In this case the mirror surface 18 will remain stationary during the printing of a row and the deflecting current for this mirror will only be changed at the end of a particular row. Mirror 16, on the other hand, will move after each complete number has been printed. An alternative is to apply a continuously increasing horizontal deflecting current, as described in connection with FIGURE 9, so that mirror 16 will continuously move across the printing surface. Again, if the character "on" time is sufficiently low, there will be a minimum of smudging of the film surface. The vertical deflection current will only be changed at the end of a particular row.

FIGURE 11 illustrates still a further method in which the printing is done in rows. In this case the printing follows path 102 and both the horizontal and vertical deflection currents are continuously increased. By continuously increasing the horizontal deflecting current, the printed matter moves across the page. However, if at the same time the vertical deflecting current is increased, the row will bend downward as illustrated. The advantage of such an arrangement is that printing time will be decreased as there is no waiting period as the mirrors move.

FIGURE 12 illustrates still a further printing format. In this case the information received is not printed in sequence, but is printed in a predetermined position on command. For example, assuming the first number is to be printed in column $a$ and row 1, positioning signals appropriate for moving the mirrors to this position will be supplied by the controller, from information received from the information storage unit 28. If the second number is to be printed in row $b$, column 4, suitable control signals will again be supplied to the deflection system to move it to an appropriate position. In like manner, succeeding numbers may be printed in any column and any row depending upon the positioning signal supplied to the controller.

Portions of the control circuits for the printer disclosed herein may be conventional. However, certain parts of the circuits are unique in that they provide improved galvanometer control and high speed printing. These circuits will be described.

The galvanometer movements 20 and 22 are of a conventional type and utilize current to control the position of the mirror, with the amount of current determining the position of the mirror. The positioning signal may be supplied from the information storage unit 28 to the controller 34 and normally will be in the form of digital signals. These digital signals must first be converted to a usable form, for example current or voltage. The circuit of FIGURE 13 illustrates a digital to analog current converter which can be used to control the galvanometer movements. It should be realized that the circuit of FIGURE 13 will be suitable for one mirror and will be duplicated for the other mirror. The circuit of FIGURE 13 is arranged for binary input information and normally each of the terminals 0 through 5 will be negative. These terminals will individually go positive to allow varying amounts of current to flow to the load. Resistors 104 vary in value, as shown, so that predetermined amounts of current may be supplied to the load when any one or more of the terminals 0–5 goes positive. Diodes 106 and 108 form part of the digital to analog converter and the cathode of each of these diodes forms the output from the converter.

It is necessary in a galvanometer control circuit of this type to completely cut off the current to the galvanometer during non-printing periods. At times the incoming digital information may vary wildly when there is no printing operation in process and it is necessary to keep the mirrors stationary to prevent any damage. All of the cathodes of diodes 108 are connected to the anodes of diodes 110 and 112. The cathode of diode 112 is connected to the print terminal 114. This terminal is normally negative and only goes positive when a printing operation is to commence. The negative voltage from terminal 114 is sufficiently negative to back bias diode 110 and cut off any signal from the digital to analog converter.

An additional problem in using galvanometer movements is that there may be a certain amount of "backlash" or "hysteresis" or bearing friction, following a large change in position of the mirror. For example, when the mirror moves from the bottom of one column to the top of the next the top two numbers may be positioned too close together. This problem has been overcome by adding a small amount of current to the output of the converter whenever printing is to occur in any line but the top line. As shown in FIGURE 13, the anode of diodes 116 are connected directly to input terminals 0–5. The cathode of diode 116 is connected through a resistor to a negative voltage and is also connected to the cathode of a diode 118. The anode of diode 118 is connected through a resistor with a positive voltage and also to the anode of a second diode 120. As terminals 0–5 are normally negative, the anodes of diodes 116 are also negative. When printing is to take place on the top line, there is no gate at any of the input terminals 0–5 and both the anode and cathode of diode 118 remain negative with the result that the anode of diode 120 will be negative and this diode will be cut off. When printing is to take place on any other line, there will be a positive voltage at one of the terminals 0–5, or at more than one of these terminals, and the anode of the appropriate diode or diodes 116 will go positive. When this occurs, diode 118 will be cut off and the positive voltage connected to diode 120 will provide a small current through diode 120 and diode 110 to the load. This small positive current will be supplied at every printing position except for the top row in a particular column. In this way all of the remaining rows in the column will have an additional positive current which will move these numbers down a small amount.

In order for proper damping, the galvanometer movement must be fed from a low impedance driving source. To convert the circuit of FIGURE 13, as described so far, into a low impedance source, a transistor 122 is connected to the output of diode 110 with the collector output of this transistor being fed to the base of a second transistor 124. The output from the emitter of transistor 124 is fed to the load 126. The combination of transistors 122 and 124 connected in the manner shown provides a low driving source impedance for the load 126.

A position centering control is indicated generally at 128 and may include a resistor 130 connected to the arm of a variable resistor 132. The current provided by the position centering control is effective to maintain the mirrors always in a position to direct the character image to the film strip. Without such a position centering control, it would be impossible for the mirrors to become misaligned relative to the path from the character image to the film strip. The position centering control adds a predetermined amount of voltage to the base of transistor 124 in the nature of a biasing voltage. The signal from the collector of transistor 122 which will be the positioning signal to cause movement of the galvanometer, will be on top of the biasing signal from the position centering control.

It frequently happens that computers and other instruments such as radiation analyzers deliver information to be printed in serial, or digit-at-a-time, decimal form. This information can be printed by the use of a single character forming device of the type described, with the mirrors being moved after each digit. A more advantageous way of printing such information is to use a bank of tubes, as described, and to sequentially operate the tubes as the input information is received and thus move the mirrors after a complete number has been printed. For example, assuming the input information is received a digit at a time, the tubes would be sequentially ionized and the characters sequentially produced. After a complete number has been formed, in sequence, in the bank of tubes, the mirrors would move to print the next number. Such an arrangement is substantially cheaper in that it enables a single driving circuit to be used for all of the character forming tubes.

Considering FIGURE 14, input terminals 134 receive a binary coded decimal signal which, after passing through the four-wire to ten-wire converter 136, is supplied to the base of transistors 138 in decimal form. Each of the transistors 138 is arranged to cause a particular character, from 0–9, to be produced by one of the character producing tubes. Three tubes, indicated at 140, 142, and 144 are illustrated. If there were five digits per number, there would be five tubes, and three tubes are only for purposes of illustration. The anodes of tubes 140, 142 and 144 are connected respectively to the collectors of transistors 146, 148 and 150 and to resistors 152. Resistors 152 are connected to a positive source of voltage at terminal 154. There are ten cathodes in each tube, with each of the cathodes being shaped to form a particular decimal character. Cathodes for forming the same character in each of the tubes are commonly connected to one of the transistors 138.

In operation, transistors 146, 148 and 150 are normally conducting, which means that the anodes of the three tubes are at ground potential. None of the cathodes of the tubes will be more negative than ground and none of the tubes will be ignited and no characters will be formed. If it is desired to ignite the middle tube 142, then the base voltage of transistor 148 becomes negative, by suitable external control, so that this transistor becomes non-conducting. The anode of tube 142 then rises to a high positive voltage, for example 150 volts or the like, depending upon the voltage at terminal 154. The incoming signal will be converted to decimal form and one of the transistors 138 will conduct holding the three cathodes associated with that transistor at ground. Because only the middle tube 142 has an anode at a high enough potential, only this tube is ionized and the character is only formed at the middle tube. The sequence of tube firing can be very rapid and only a single set of control transistors is necessary for operation of the tubes.

The use, operation and function of the invention are as follows:

Rapid advances in techniques for accumulating and transmitting information have far outpaced known techniques for displaying and printing that information. This is true in both the data processing field and the field of communications. Whereas it may take only seconds or minutes for electronic equipment to accumulate or transmit information, it may take hours for present-day electromechanical equipment to produce a visual record of the same information. The present invention provides an improved high speed recorder or electro-optical printer which can record extremely large amounts of information in a matter of a few minutes.

There are in use relatively simple storage counters where the volume of information stored is not great and where the incidents being counted occur continuously and at a high rate and where it is desirable to inquire frequently as to the accumulated count. Read-out from the counter to the printer requires that the counter be paralyzed or inactive as to any incoming counts. In this instance it is desirable that read-out be effective at very high speeds which will be brief and not unduly affect the "live" or active count time of the counter. The present invention provides such a means for rapid read-out.

A further problem commonly found in data processing is that of recording in a column and row format. Information may be received as to column and row position, but it is not received in any predetermined order of position. The present invention can provide recording in sequence, in that it can record either in a column or a row order. In addition, recording can be random to the extent that numbers for particular row and column locations can be recorded, but not in any predetermined sequence.

As shown in FIGURE 1, the information may be provided by a single character image producer, but it is preferred to use multiple tubes. In any event, the image or images produced are directed through a deflecting system consisting of mirrors movable on two different axes, to a recording medium which in the preferred form is a self-developing film of the polaroid type. In FIGURE 1, two different mirrors, one rotatable about the vertical axis and the other rotatable about a horizontal axis are used. In FIGURE 2 a universally movable mirror provides the same function.

The type of tube for producing the images may vary, and it is preferred to use a gas discharge cold cathode tube which is capable of fast operation. An operating interval as brief as 100 microseconds can be used with tubes of the type described. Although the invention has been described generally as using visible light to provide the radiations for the film, the invention should not be restricted to any particular type of light as any form of electromagnetic radiation capable of being deflected and of registering on an appropriate radiation sensitive sheet may be satisfactory.

When using multiple tubes for recording, it is important to have the images produced by these tubes as close together as possible in order to increase the information density on the film strip. One way of increasing the information density or decreasing character spacing is the arrangement shown in FIGURE 3 in which each of the tubes has its output directed at a reflecting prism. The prisms are so arranged that the character spacing, after being reflected, is substantially less than it would be if the output tubes were placed side by side.

FIGURES 5 and 6 illustrate a further arrangement for accomplishing the same result. In this case some of the tubes are placed behind the other in an overlapping relationship.

One of the problems encountered in using gas tubes is that at times there is not sufficient radiation from the surrounding area to cause instant ionization of the tubes. To overcome this problem additional ionizing radiation is added to the tubes. This can be done by adding a radioactive substance within the tube itself. However, the preferred form is to use a glow tube, or some other tube providing ionizing radiation, shielded from the film strip, and arranged to direct its light on the character tube. Preferably the glow tube is operated at a small fraction of its power except during periods in which the printer is in operation. This is necessary in that the glow tube itself must instantly ionize and it may cause fogging of the film if it is not operated at substantially reduced power.

The control circuits for the galvanometer movements are important. First of all, no current should be supplied during non-printing periods. At times information to the input of the digital to analog converter may vary wildly and this would cause severe movement of the galvanometer, when actually no movement was required. Accordingly, a suitable current cut-off has been provided.

Another problem involved in printing in column and row formats is that extremely large movements of the galvanometer movement sometimes does not result in proper spacing between numbers. This may be caused by the friction in the galvanometer bearings. To overcome this problem a small additional current is added to the galvanometer control current for printing in every row but the top row. If it is desired, similar spacing currents can be added for other printing positions.

Most information coming from computers and storage members will be fed out in serial form or a digit at a time. In order to print this information as economically as possible and yet as rapidly as possible, it is proposed to use a single driving circuit for all of the character forming tubes. This driving circuit will be switched from tube to tube and after all of the tubes have printed either character for forming a particular word or number, the mirror system will then move to a position for the next number. The saving in circuitry is substantial and the arrangement is substantially faster than using a single character producing tube and moving the mirrors for each digit.

The invention has been described as using current-operated galvanometer movements for the mirrors. The invention should not be so limited, as other current or voltage responsive devices may be satisfactory.

Whereas the preferred form of the invention has been shown and described herein, it should be realized that there are many modifications, substitutions and alterations thereto within the scope of the following claims.

We claim:

1. In a high speed recording system, means for producing electromagnetic radiation, on command, in the shape of any one of a plurality of characters, an electromagnetic radiation sensitive recording medium, movable electric-current operated radiation-deflecting means positioned between said radiation producing means and recording medium, control means for providing current to move said deflecting means to position a character image on a limited area of said recording medium including a digital to analog current converter, and means for cutting off the current to said deflecting means during non-recording periods including a diode in circuit between said digital to analog current converter and said current operated deflecting means, and circuit means for applying a negative voltage to the anode of said diode during non-recording periods.

2. The structure of claim 1 further characterized in that said control means for providing current to move said deflecting means includes means for adding additional current to the current operated deflecting means for all positions of said deflecting means except a certain one to maintain predetermined character spacing on said recording medium.

3. In a high speed recording system, a plurality of character image producing tubes each including an anode and a plurality of cathodes, one for each character produced by the tube, corresponding cathodes of said tubes being connected together, a light sensitive recording medium, movable light deflecting means positioned between said tubes and recording medium, control means for moving said deflecting means to position character images from said tubes on a limited area of said recording medium, a character selection circuit including means for applying a signal to corresponding cathodes of said tubes in accordance with the character to be produced, and means for applying a more positive signal to only one of said anodes so that the desired character is produced at only one tube.

4. The structure of claim 3 further characterized in that said tubes are ionized and produce characters, one at a time, with the sum of characters from all of the tubes being recorded on said recording medium before said deflecting means moves to a new position.

5. The structure of claim 3 further characterized in that each of said image producing tubes have image producing faces, said tubes being positioned relative to each other such that the areas of said tubes which is exposed to said light sensitive recording medium is less than the total combined image producing faces of said tubes.

6. The structure of claim 5 further characterized in that said tubes all face in the same direction, with adjacent tubes being positioned one behind the other, in a partially overlapping arrangement.

7. The structure of claim 5 further characterized in that said tubes are arranged in two groups, facing each other, and means between said groups of tubes for simultaneously directing the character images from all tubes toward said deflecting means.

8. The structure of claim 7 further characterized in that the means between said groups of tubes for simultaneously directing the character images from all tubes toward the deflecting means includes a plurality of light reflecting prisms arranged side by side.

9. The structure of claim 3 further characterized by means for adding ionizing radiation to each of said image producing tubes.

10. The structure of claim 9 further characterized in that the means adding ionizing radiation to said tube includes a radioactive substance positioned inside of said tube.

11. The structure of claim 9 further characterized in that the means adding ionizing radiation to said tube includes means for exposing said tube to ultraviolet radiation.

12. The structure of claim 9 further characterized in that the means adding ionizing radiation to said tube includes a tube emitting ionizing radiation, circuit means normally operating said ionizing radiation emitting tube at a fraction of its normal power, and circuit means for supplying full power to said ionizing radiation emitting tube when said gas character image tube is to be ionized.

References Cited by the Examiner
UNITED STATES PATENTS

| | | | |
|---|---|---|---|
| 2,309,048 | 1/1943 | Curry | 88—24 |
| 2,495,296 | 1/1950 | Springer | 95—4.5 X |
| 2,600,168 | 6/1952 | Klyce | 95—4.5 |
| 2,720,642 | 10/1955 | Blakely | 95—4.5 X |
| 2,736,770 | 2/1956 | McNaney | 178—15 |
| 3,007,380 | 11/1961 | Ketz | 95—4.5 |

JOHN M. HORAN, *Primary Examiner.*

NORTON ANSHER, *Examiner.*